June 19, 1956     DE WITT H. WYATT     2,751,236
EXTERNAL JOINT SEALING STRIP

Filed June 20, 1952     3 Sheets-Sheet 1

INVENTOR
DeWitt H. Wyatt
BY W. S. McDowell
ATTORNEY

June 19, 1956     DE WITT H. WYATT     2,751,236
EXTERNAL JOINT SEALING STRIP

Filed June 20, 1952     3 Sheets-Sheet 2

INVENTOR
DeWitt H. Wyatt

BY W. S. McDowell

ATTORNEY

June 19, 1956  DE WITT H. WYATT  2,751,236
EXTERNAL JOINT SEALING STRIP
Filed June 20, 1952  3 Sheets-Sheet 3

INVENTOR
De Witt H. Wyatt

BY *W. N. McDowell*

ATTORNEY

United States Patent Office 2,751,236
Patented June 19, 1956

2,751,236

EXTERNAL JOINT SEALING STRIP

De Witt H. Wyatt, Columbus, Ohio

Application June 20, 1952, Serial No. 294,570

1 Claim. (Cl. 285—114)

This invention relates to pipe joints or couplings, and, more particularly, to joints or couplings employed in uniting plain-ended pipe members found in various fluid-conducting systems in which relatively low internal pressures normally are present.

It is an object of the invention to provide an improved fluid-confining joint or coupling of the compression type adapted for application to the meeting ends of plain-ended or barrel-type pipe members, and wherein the joint or coupling is characterized by its ease of application to associated pipe members, its pipe-aligning properties, the tightness and security offered by the same in preventing the escape of fluid from the pipe system and, also, in the structural simplicity and economy of its construction.

Another object of the invention is to provide a pipe joint or coupling for plain-ended pipe members of the type in which said members are of uniform diameter throughout the length thereof, and wherein the joint or coupling is formed to comprise a circumferentially contractible band adapted for circular application about the abutting meeting ends of such pipe members, and wherein the band has mounted on the inner side thereof a plastic body composed of pressure deformable joint-calking and sealing materials so disposed as to bridge the joints defining the meeting ends of a pair of associated pipe members.

A further object of the invention resides in the provision of a joint or coupling of the character set forth and embodying an outer draw band which, when tightened about the joints formed between the abutting ends of a pair of associated pipe members, maintains the latter in longitudinal alignment, and effectively precludes fluid passage or seepage through the abutting ends of the joined pipe members.

A further object of the invention resides in a pipe joint or coupling having a contractible outer band of thin sheet metal to which is applied an inner facing or body composed of a compressible material, and wherein the ends of the outer band are retained against relative separation and in compressive engagement with the facing by a slotted locking plate, the latter carrying means for adjustably fastening the band ends thereto in a manner placing and holding said band under tension.

In accordance with the present invention, a pipe joint or coupling is provided for uniting the contiguous plain ends of barrel-type pipe members in secured, longitudinally aligned and fluid-tight order. The coupling comprises an outer circumferentially contractible band which possesses a length capable of encircling the adjoining ends of a pair of aligned pipe members. The band carries on its inner face a yieldable joint-sealing body composed of a pressure deformable material, such as an asbestos-asphaltic compound, said member being adapted for direct contact with the outer surfaces of associated pipe members and in overlapping relationship to abutting joint surfaces present between said members. In this construction there is embedded in the deformable body a joint-reenforcing strip, composed of a mineral fiber fabric. Also, the coupling provides a fastening plate associated with the free ends of the clamping band, the plate having means formed therewith providing for the contraction of the band about the joints of pipe members and the retention of the band in its contracted state, whereby to hold the inwardly disposed joint-sealing body and its reenforcing fabric in secured leak-preventing engagement with adjacent ends of the associated pipe members.

For a further understanding of the invention, reference is to be had to the following description and the accompanying drawings, wherein.

Referring more particularly to the drawings, the same disclose a pair of pipe members of the plain-ended barrel type, the said pipe members being indicated at 1 and 2. As shown, these members are provided with abutting joint-forming surfaces 3 at the ends thereof. The pipe members are of uniform diameter throughout their length and are devoid of interfitting bell and socket formations present in certain types of molded or cast pipe, the latter being composed preferably of ceramic materials. However, it will be understood that the pipe members may be formed from any suitable materials and may possess any desired cross-sectional configuration.

In order to close the butt joints of such pipe members, and to unite the latter securely in longitudinally aligned leak-proof order, the present invention provides a coupling which offers certain advantages, hereinafter described, over previously developed couplings of this nature. In the specific form of the invention illustrated, the coupling comprises an outer draw band 4, the latter being formed preferably from relatively thin sheet metal and provided with oppositely sloping walls 5.

Figure 4:
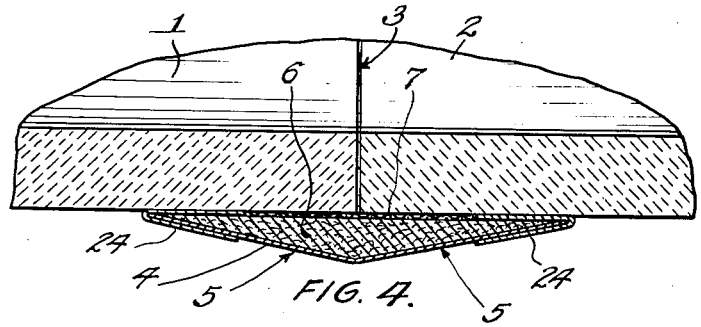
Fig. 4 is an enlarged detail longitudinal sectional view taken through the joint or coupling on the line 4—4 of Fig. 1.
Figure 5:
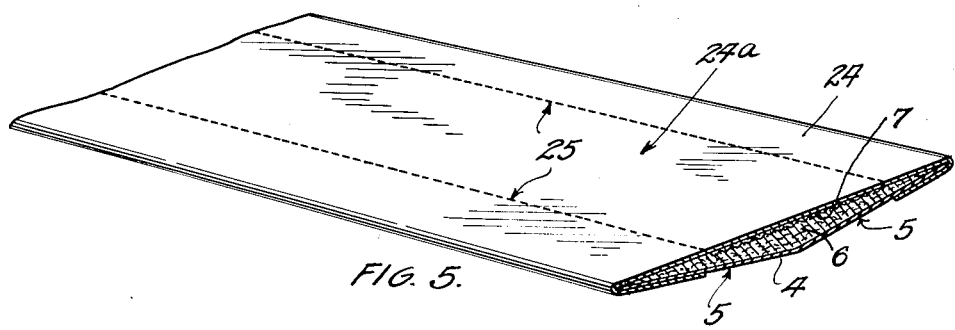
Fig. 5 is a fragmentary perspective view disclosing the clamping band of the joint or coupling and the compressible body material carried by the inner face of the band.
Figure 6:
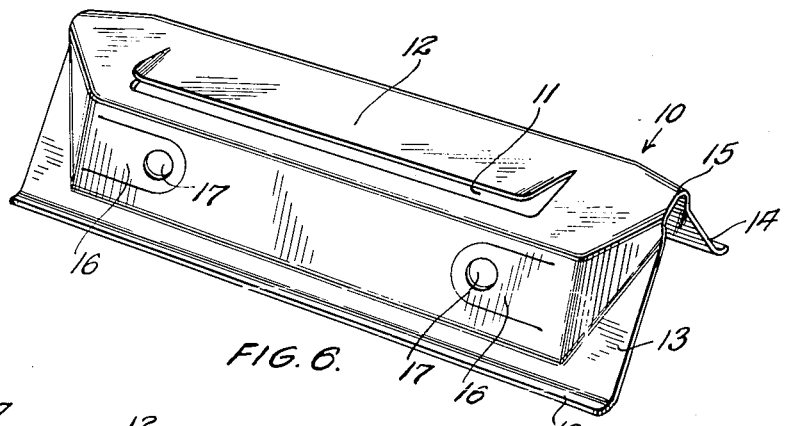
Fig. 6 is a perspective view of the securing plate employed in retaining the clamping band in its operative position around a pair of pipe members.
Figure 7:
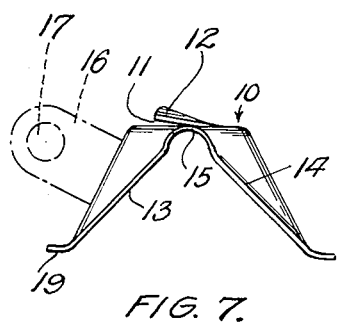
Fig. 7 is an end elevational view of the clamping plate.

Applied to the inner surfaces of the band 4 is a compressible or pressure deformable joint sealing body 6 which, in its preferred composition, embodies a soft plastic mixture of putty-like consistency, such as a mixture of asphalt and asbestos. The body 6 may be suitably deposited on the inner surfaces of the band so that it possesses substantially the cross-sectional configuration thereof, the body adhering because of its tackiness to the inner surfaces of the band without requiring the use of adhesives or mechanical fastening means. The inner surface of the sealing body so formed is substantially flat, as shown in Figs. 4 and 5, adapting the same for engagement with pipe members 1 and 2.

To reenforce the compressible sealing body and prevent loss thereof in the pipe joint 3, there is embedded in the inner and under surface of the body a strip 7 composed of a joint-calking and reenforcing material, such as a mineral fiber fabric. The body 6 and strip 7 are substantially of equal length, but are shorter than the full length of the metallic draw band 4, so that the latter may be provided with unfaced securing or attaching ends 8 and 9.

To hold the coupling in operative fastened engagement on the adjoining ends of a pair of pipe members, use is made of an anchoring plate 10. This plate preferably is of metallic construction, being formed to provide a longitudinally extending slot or slit 11 and an overlying tongue 12. The plate 10 further includes downwardly diverging wings shown at 13 and 14, which are united by a web 15. The wing 13 may be provided with outwardly bendable bearing brackets 16, formed with holes 17 for the reception of a rotatable bend-tightening key 18.

Figure 3:
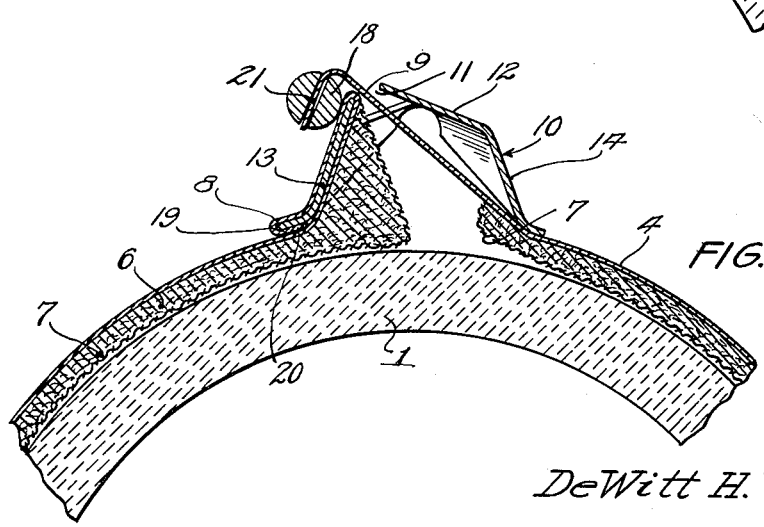
Fig. 3 is a similar view disclosing the joint or coupling when initially applied on a pipe and prior to being contracted thereabout.

In the use of the coupling, the latter is first placed around the meeting ends of a pair of associated pipe members after the manner disclosed in Fig. 3 of the drawings. It will be noted that when so positioned, the attaching end 8 of the band 4 is passed from beneath the anchoring plate 10 through the slit 11 formed therein, so that the outer edge portion of the attaching end 8 may be bent around the outer longitudinal edge 19 whereby the end 8 will be disposed beneath the wing 13, as indicated at 20. While the band 4 is formed from metal, nevertheless, the metal is sufficiently pliable and readily bendable that the same may be readily fashioned to provide the U-shaped gripping region 20, enabling the band to resist forces tending to disengage the same from the anchoring plate when the band is contracted about the pipe members.

The opposite attaching end 9 of the band 4 is also passed through the slit 11 above the band end 8. In carrying out this operation the width of the slit may be increased by pressure applied in an inward direction to the lower longitudinal edge of the wings 13 and 14. After insertion the inward pressure is released, causing the tongue to return to its normal position in which it will grip the inserted ends of the band. The end 9 is then secured as at 21 to the key 18 which may be revolubly mounted in the brackets 16, although the latter may not be used. The key is formed at one end with an eye 23 in which a rotating device such as the end of another duplicate key, may be inserted to assist an operator in manually rotating the key when contracting the band. The end 9 may, if desired, be bent around the outer edge of the tongue 12 after being tightened by the rotation of the key, so that the friction between the end 9 and the outer edge of the tongue 12 may be utilized in locking or holding the contracted positions of the band.

A covering 24 of wax or parchment paper may be applied to the pipe-engaging surface of the body 6, the strip 7 and the outer surfaces of the band 4 to confine the body material in the band and to prevent hardening or oxidation thereof when the coupling is stored prior to use. The paper wrapper or covering is adhesively joined along the longitudinal edges thereof with the reversely inclined outer surfaces of the band 4. When the coupling is applied, the paper strip is torn along the scored parallel lines shown at 25 in Fig. 5, as by the use of tear strings or the like, so that the body material and strip 7 will be directly exposed, as shown in Fig. 4, for contact with the outer surfaces of the pipe members 1 and 2 on each side of the joint 3.

Figure 1:
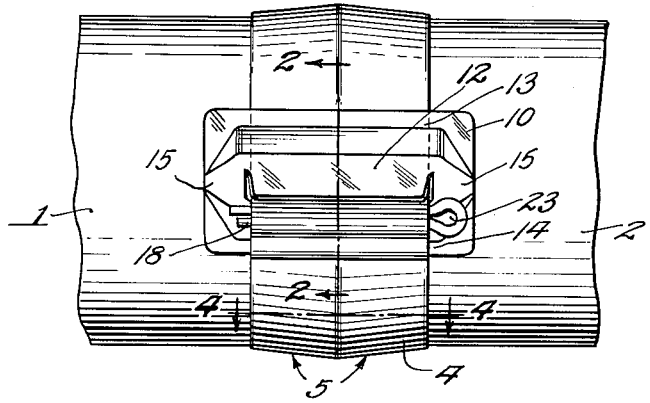
Fig. 1 is a top plan view of a pipe joint or coupling formed in accordance with the present invention.
Figure 2:
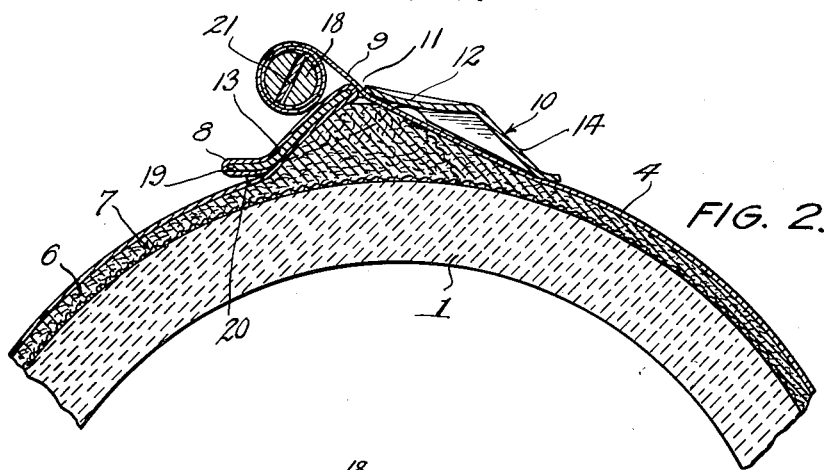
Fig. 2 is a vertical transverse sectional view taken on the plane indicated by the line 2—2 of Fig. 1.

The present invention thus provides a pipe coupling which is completely produced prior to application and is capable of ready and simple application to the meeting ends of ceramic or other pipe members, whereby to retain the latter in longitudinally aligned order and prevent the passage of fluid through the joint surfaces enclosed by the coupling. Due to its completely prefabricated form and structural simplicity, the coupling may be readily applied to pipe members by relatively unskilled labor. It is merely necessary for workers completing the coupling to remove the paper strip 24a between the tear lines 25 of the paper covering to expose the tacky relatively soft plastic body 6 and its reenforcing strip 7 and following such removal to then apply the coupling around the pipe members with the exposed surfaces directly contacting the pipes. Thereafter, the ends 8 and 9 of the band are inserted through the slit 11 in the anchor plate. The end 8 may then be bent to engage and grip the edge 19 of the plate wing 13. The end 9 is inserted in the slot formed longitudinally in the key 18 which, as shown in Fig. 1, may be in the form of an enlarged cotter key or pin. By rotating the key through inserting the shank end of another similar key in the eye of the first key, the end 9 of the band may be rolled about the key, as shown in Figs. 2 and 3. The band is tightened thereby to compress the deformable body material 6. This action causes the material 6 to enter the joint 3, but the degree of this entrance or penetration is limited by the reenforcing strip 7. The band 4 may be tightened to the desired extent, placing the body 6 and the strip 7 under compression and closing and sealing the butt joint formed between the pipe members. Equal convenience is obtainable in removing an applied coupling from associated pipe members. Because of the bituminous nature of the body 6, the same will set and harden after a given period of time, so that if the outer band should through corrosion or the like deteriorate to a very considerable extent, the joint seal will remain durable and effective.

Figure 8:
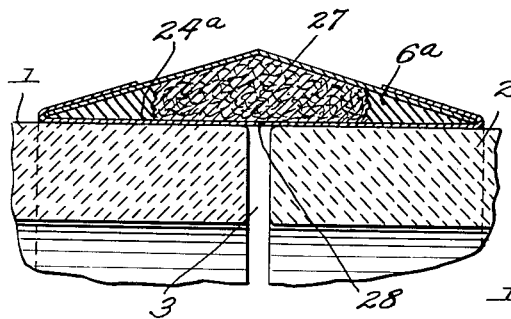
Figs. 8 through 12 are detail longitudinal sectional views taken through modified forms of my improved joint or coupling.
Figure 9:
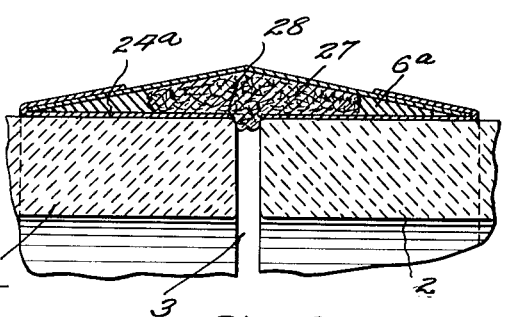

In the form of my invention disclosed in Fig. 8, the joint sealing body 6a is the same as that disclosed in the preferred form with the exception that the plastic body shown at 6a is provided with a calking material 27, which is arranged over the joint 3, so that when the material is compressed, as shown in Fig. 9, the same will break the paper wrapping 24a along the scored or weakened region 28 so that fibrous calking material may enter the joint space 3 provided between the pipe sections 1 and 2.

Figure 10:
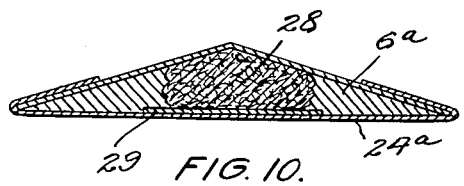
Figure 11:
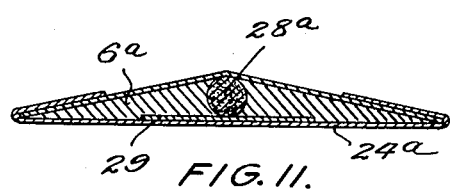
Figure 12:
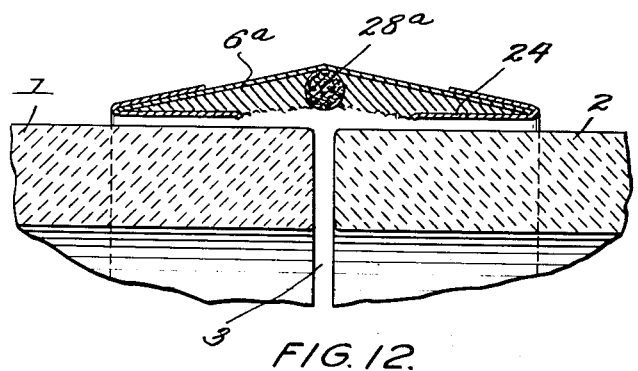

A similar arrangement has been disclosed in Fig. 10, but in this figure, the paper wrapping 24a is reenforced by an added sheet 29 beneath the fibrous material 28. Likewise, in Fig. 11, the fibrous material 28a of glass wool is of rounded or cable-like form. A similar arrangement is shown in Fig. 12, but in this form of the invention, the calking reenforcement 28a will enter directly the joint 3 when the paper 24 is torn away from contact with the central under portion of the strip 6a.

I claim:

In a flexible pipe coupling; a joint-encircling strip comprising an interior filling consisting of a tacky yieldable, pressure deformable composition, said strip normally being low and wide and substantially triangular in its transverse cross section, having a flat, inner surface for direct application to the outer circumferential surfaces and meeting ends of a pair of longitudinally aligned pipe members, the central region of the strip completely encircling and bridging the joint space formed between the meeting ends of said pipe members, the apex portion of the strip being covered by a relatively strong flexible material; and a relatively weak flexible sheet of covering material covering the base and meeting with the apex covering material on the sides of said strip and conforming to its configuration, said covering material adjacent the center of the flat inner surface of said strip being weakened along transversely spaced, parallel lines to provide a web adapted to be removed at the time of application of the strip to the pipe members, whereby to cause the central, longitudinally extending region of the tacky flat inner surface of the strip to engage directly with adjacent meeting ends of pipes about which the strip is to be applied, said interior filling tending to extrude into a joint space formed between the meeting pipe ends.

(References on following page)

References Cited in the file of this patent

UNITED STATES PATENTS

| | | |
|---|---|---|
| 809,327 | Rieske | Jan. 9, 1906 |
| 980,671 | Price | Jan. 3, 1911 |
| 1,451,731 | Higdon | Apr. 17, 1923 |
| 1,578,734 | Hume | Mar. 30, 1926 |
| 1,881,439 | Fischer | Oct. 11, 1932 |
| 1,966,231 | Andrus | July 10, 1934 |
| 2,205,910 | Raybould | June 25, 1940 |
| 2,448,769 | Chamberlain | Sept. 7, 1948 |
| 2,596,179 | Seymour | May 13, 1952 |

FOREIGN PATENTS

| | | |
|---|---|---|
| 640 | Great Britain | Jan. 4, 1884 |
| 466,056 | Germany | Sept. 13, 1928 |